(12) United States Patent
McCloy, III et al.

(10) Patent No.: US 7,590,707 B2
(45) Date of Patent: Sep. 15, 2009

(54) METHOD AND SYSTEM FOR IDENTIFYING NETWORK ADDRESSES ASSOCIATED WITH SUSPECT NETWORK DESTINATIONS

(75) Inventors: Harry Murphey McCloy, III, Longmont, CO (US); Craig Mitchell Shifman, Black Hawk, CO (US)

(73) Assignee: Webroot Software, Inc., Boulder, CO (US)

( * ) Notice: Subject to any disclaimer, the term of this patent is extended or adjusted under 35 U.S.C. 154(b) by 627 days.

(21) Appl. No.: 11/462,781

(22) Filed: Aug. 7, 2006

(65) Prior Publication Data

US 2008/0034073 A1 Feb. 7, 2008

(51) Int. Cl.
*G06F 15/16* (2006.01)
(52) U.S. Cl. .................. 709/217; 709/223; 709/238; 726/22; 726/24
(58) Field of Classification Search ............ 709/217, 709/223, 238; 726/22–25
See application file for complete search history.

(56) References Cited

U.S. PATENT DOCUMENTS

| | | |
|---|---|---|
| 5,623,600 A | 4/1997 | Ji et al. |
| 5,920,696 A | 7/1999 | Brandt et al. |
| 5,951,698 A | 9/1999 | Chen et al. |
| 6,069,628 A | 5/2000 | Farry et al. |
| 6,073,241 A | 6/2000 | Rosenberg et al. |
| 6,092,194 A | 7/2000 | Touboul |
| 6,154,844 A | 11/2000 | Touboul |
| 6,167,520 A | 12/2000 | Touboul |
| 6,310,630 B1 | 10/2001 | Kulkarni et al. |
| 6,397,264 B1 | 5/2002 | Stasnick et al. |
| 6,405,316 B1 | 6/2002 | Krishnan et al. |
| 6,460,060 B1 | 10/2002 | Maddalozzo, Jr. et al. |
| 6,480,962 B1 | 11/2002 | Touboul |

(Continued)

OTHER PUBLICATIONS

U.S. Appl. No. 10/956,274, filed Oct. 1, 2004, Justin Ryan Bertman.

(Continued)

*Primary Examiner*—Phuoc Nguyen
(74) *Attorney, Agent, or Firm*—Cooley Godward Kronish LLP

(57) ABSTRACT

A method and system for identifying network addresses associated with suspect network destinations is described. One embodiment receives a target Uniform Resource Locator (URL) to be analyzed; segments the target URL into a set of component parts; classifies each component part in the set of component parts as a primary domain, a subdomain, or a page; hashes each component part in the set of component parts to produce a hash value for that component part; compares the hash values of the set of component parts from the target URL with hash values stored in a database, the hash values stored in the database having been obtained by segmenting, classifying, and hashing, in the same manner as the target URL, each of a set of URLs known to be associated with suspect network destinations; computing a score that indicates the extent to which the hash values of the set of component parts from the target URL match hash values stored in the database; and taking corrective action, when the score satisfies a predetermined criterion. In one embodiment, taking correction action includes notifying a user that the target URL is believed to be associated with a suspect network destination. In another embodiment, taking corrective action includes blocking a network connection between a computer and the network destination associated with the target URL.

20 Claims, 9 Drawing Sheets

U.S. PATENT DOCUMENTS

| | | |
|---|---|---|
| 6,535,931 B1 | 3/2003 | Celi, Jr. |
| 6,611,878 B2 | 8/2003 | De Armas et al. |
| 6,633,835 B1 | 10/2003 | Moran et al. |
| 6,667,751 B1 | 12/2003 | Wynn et al. |
| 6,701,441 B1 | 3/2004 | Balasubramaniam et al. |
| 6,772,345 B1 | 8/2004 | Shetty |
| 6,785,732 B1 | 8/2004 | Bates et al. |
| 6,804,780 B1 | 10/2004 | Touboul |
| 6,813,711 B1 | 11/2004 | Dimenstein |
| 6,829,654 B1 | 12/2004 | Jungek |
| 6,910,134 B1 | 6/2005 | Maher et al. |
| 6,965,968 B1 | 11/2005 | Touboul |
| 7,058,822 B2 | 6/2006 | Edery et al. |
| 7,107,617 B2 | 9/2006 | Hursey et al. |
| 7,146,429 B2 * | 12/2006 | Michel ........................ 709/238 |
| 2002/0143984 A1 * | 10/2002 | Hudson Michel ........... 709/238 |
| 2002/0162015 A1 | 10/2002 | Tang |
| 2002/0166063 A1 | 11/2002 | Lachman et al. |
| 2003/0065943 A1 | 4/2003 | Geis et al. |
| 2003/0074581 A1 | 4/2003 | Hursey et al. |
| 2003/0101381 A1 | 5/2003 | Mateev et al. |
| 2003/0159070 A1 | 8/2003 | Mayer et al. |
| 2003/0217287 A1 | 11/2003 | Kruglenko |
| 2004/0030914 A1 | 2/2004 | Kelley et al. |
| 2004/0034794 A1 | 2/2004 | Mayer et al. |
| 2004/0064736 A1 | 4/2004 | Obrecht et al. |
| 2004/0080529 A1 | 4/2004 | Wojcik |
| 2004/0143763 A1 | 7/2004 | Radatti |
| 2004/0172551 A1 | 9/2004 | Fielding |
| 2004/0187023 A1 | 9/2004 | Alagna et al. |
| 2004/0225877 A1 | 11/2004 | Huang |
| 2005/0005160 A1 | 1/2005 | Bates |
| 2005/0038697 A1 | 2/2005 | Jeffrey |
| 2005/0138433 A1 | 6/2005 | Linetsky |
| 2005/0154885 A1 | 7/2005 | Viscomi et al. |
| 2006/0075468 A1 * | 4/2006 | Boney et al. .................... 726/2 |

OTHER PUBLICATIONS

U.S. Appl. No. 11/171,924, filed Jul. 1, 2005, Paul Piccard.
Codeguru, Three Ways to Inject Your Code Into Another Process, by Robert Kuster, Aug. 4, 2003, 22 pgs.
Codeguru, Managing Low-Level Keyboard Hooks With The Windows API for VB .Net, by Paul Kimmel, Apr. 18, 2004, 10 pgs.
Codeguru, Hooking The Keyboard, by Anoop Thomas, Dec. 13, 2001, 6 pgs.
Illusive Security, Wolves In Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 6 pgs.
Microsoft.com, How To Subclass A Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.
Yurcik, William et al., A Planning Framework for Implementing Virtual Private Networks, Jun. 2001, IT Pro, IEEE, pp. 41-44.
PCT/US2006/025378, Sep. 18, 2007, Piccard, Search Report and Written Opinion.
PCT/US2007/067082, Nov. 5, 2007, Boney, Search Report and Written Opinion.

* cited by examiner

WWW.PRODUCTS.CORPORATION.COM/WIDGETS/2006.HTM  ~205

| SEGMENT | CLASSIFICATION |
|---|---|
| CORPORATION.COM | PRIMARY DOMAIN |
| PRODUCTS | SUBDOMAIN |
| WWW | SUBDOMAIN |
| WIDGETS/2006.HTM | PAGE |

210 — SEGMENT row
215 — CORPORATION.COM
215 — WWW
220 — WIDGETS/2006.HTM

METHOD AND SYSTEM FOR IDENTIFYING NETWORK ADDRESSES ASSOCIATED WITH SUSPECT NETWORK DESTINATIONS

RELATED APPLICATIONS

The present application is related to the following commonly owned and assigned applications: U.S. application Ser. No. 10/956,274, entitled "System and Method for Locating Malware"; and U.S. application Ser. No. 11/171,924, entitled "Systems and Methods for Identifying Malware Distribution Sites"; each of which is incorporated herein by reference.

FIELD OF THE INVENTION

The present invention relates generally to computer networks. In particular, but not by way of limitation, the present invention relates to techniques for identifying network addresses associated with suspect network destinations.

BACKGROUND OF THE INVENTION

Every day, millions of computer users rely on computer networks such as the Internet for important information and for entertainment. Using the Internet is not without risk, however. For example, protecting personal computers against a never-ending onslaught of "pestware" such as viruses, Trojan horses, spyware, adware, and downloaders has become vitally important to computer users. To many parents, the proliferation of Internet pornography has become a grave concern.

One solution to the problem of harmful or undesirable network content is content filtering. Content filtering typically involves identifying network addresses associated with suspect network destinations in real time and warning a user of the possible threat or blocking the suspect network destinations before the harmful or undesirable content is accessed. Such content filtering may be implemented, for example, at the network level in an Internet gateway or in a client application such as a Web browser.

One significant challenge in performing content filtering is that the Uniform Resource Locators (URLs) associated with suspect network destinations tend to be changed frequently. In many cases, the name of a particular file (e.g., a pestware executable) on the Internet remains the same, but the server portion of the path containing the primary domain and any subdomains is changed or is rearranged in order. The dynamic nature of these URLs renders ineffective a content filtering methodology that relies on exact URL string comparisons.

It is thus apparent that there is a need in the art for an improved method and system for identifying network addresses associated with suspect network destinations.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for identifying network addresses associated with suspect network destinations. One illustrative embodiment is a method comprising collecting a set of Uniform Resource Locators (URLs), each URL in the set of URLs being associated with a suspect network destination; segmenting each URL in the set of URLs into a set of component parts; for each URL in the set of URLs, classifying each component part in the set of component parts from that URL as one of a primary domain, a subdomain, and a page; for each URL in the set of URLs, hashing each component part in the set of component parts from that URL to produce a hash value for that component part; storing in a database the hash values of the component parts of the URLs in the set of URLs; receiving a target URL to be analyzed; segmenting the target URL into a set of component parts; classifying each component part in the set of component parts from the target URL as one of a primary domain, a subdomain, and a page; hashing each component part in the set of component parts from the target URL to produce a hash value for that component part; comparing the hash values of the set of component parts from the target URL with the hash values stored in the database; computing a score that indicates the extent to which the hash values of the set of component parts from the target URL match one or more hash values stored in the database; and taking corrective action, when the score satisfies a predetermined criterion.

Another illustrative embodiment is a system comprising a segmentation module configured to segment a target Uniform Resource Locator (URL) into a set of component parts; a classification module configured to classify each component part in the set of component parts as one of a primary domain, a subdomain, and a page; a hashing module configured to compute a hash value for each component part in the set of component parts; a database containing hash values obtained from a set of URLs known to be associated with suspect network destinations, each URL in the set of URLs having been segmented, classified, and hashed in a manner analogous to the target URL; a comparison module configured to compare the hash values of the component parts in the set of component parts with hash values stored in the database and to compute a score that indicates the extent to which the hash values of the component parts in the set of component parts match hash values stored in the database; and a security module configured to take corrective action when the score satisfies a predetermined criterion. These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1A:
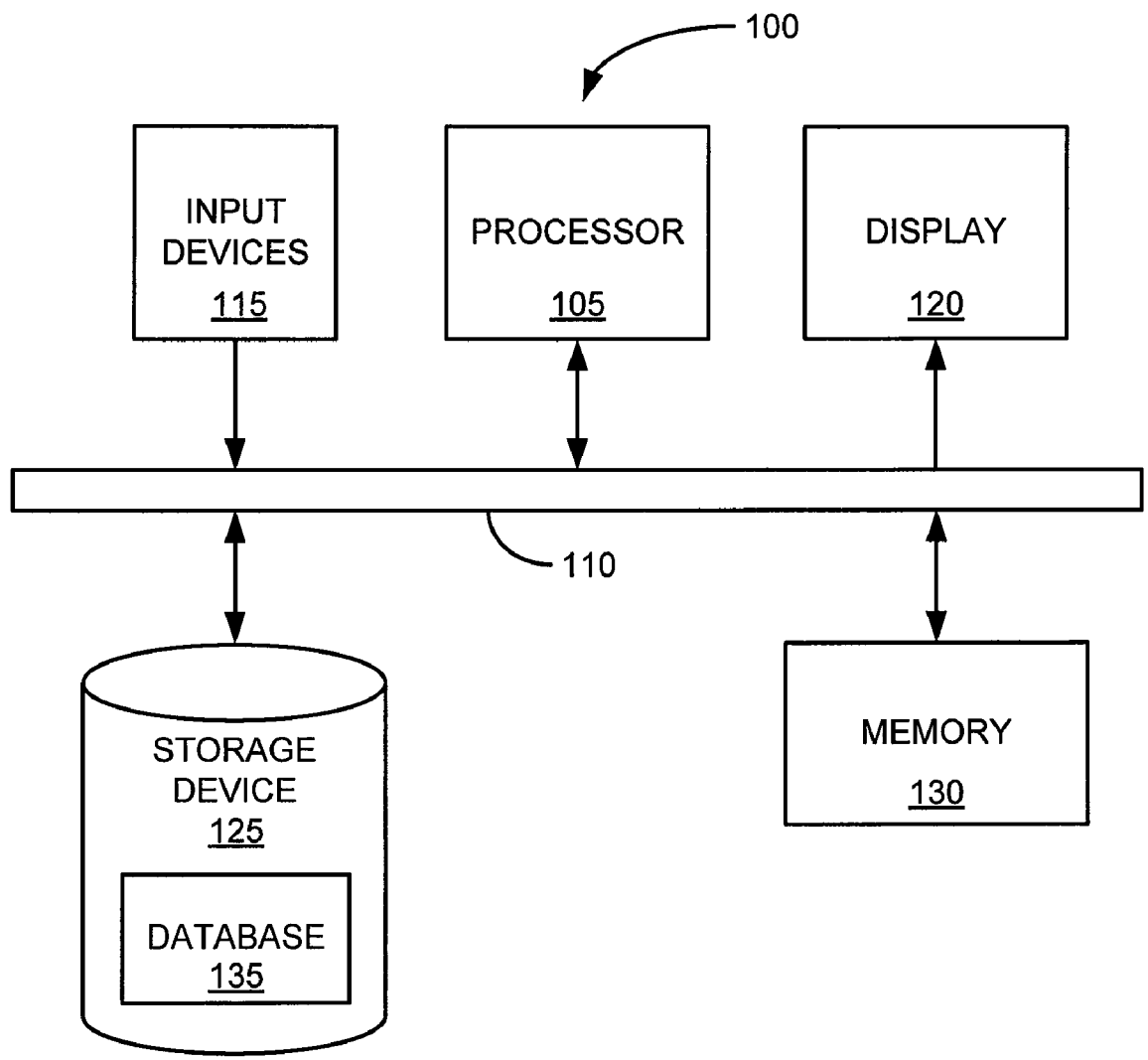
FIG. 1A is a functional block diagram of a computer equipped with a network address analyzer in accordance with an illustrative embodiment of the invention.

In an illustrative embodiment, the problem of dynamically changing network addresses associated with suspect network destinations is addressed by providing for flexible and inexact matches between a Uniform Resource Locator (URL) to be analyzed and a database containing URLs associated with known suspect network destinations. "Suspect network destination," as used herein, refers to any network destination such as a Web site or a file-transfer-protocol (FTP) site that is considered undesirable for any reason by a person or entity that desires to control or restrict access to that network destination. For example, an Internet Service Provider may desire to protect its customers from particular Web sites that contain pestware or malware, or parents may desire to prevent their children from viewing pornography sites on the Internet. These are just a couple of illustrative examples. The principles of the invention can be applied to a wide variety of content-filtering applications.

In this illustrative embodiment, a set of network addresses (e.g., URLs) associated with known suspect network destinations is gathered. This set of network addresses may be gathered using a variety of techniques, both manual and automated. For example, automated and semi-automated techniques for gathering URLs associated with pestware are described in the commonly owned and assigned U.S. applications cited in Related Applications above. Each URL in the gathered set of URLs is segmented (divided into component parts), and each segment is classified as a primary domain, a subdomain, or a page (file). A hashing function is then computed for each classified segment to produce a hash value for that segment. The hash values associated with the segments of the various URLs in the set are stored in a database.

In a content filtering application, a target URL to be analyzed is segmented, and its segments are classified and hashed in the same manner as the segments of the comparison URLs used to generate the database. The hash values of the segments from the target URL are compared with the hash values stored in the database, and a score is computed that indicates the degree to which they match. This approach allows for partial (imperfect) matches in which only some segments of the target URL match segments of a URL associated with a known suspect network destination or in which an exact match occurs for the individual component parts of the target URL but in an order different from that indicated by the database. As those skilled in the art will recognize, comparing hash values rather than the original URL strings facilitates the rapid and efficient comparison of a target URL with the set of URLs associated with known suspect network destinations.

If the computed score satisfies a predetermined criterion such as the exceeding of a threshold, appropriate corrective action can be taken. In some embodiments, taking corrective action includes alerting a user that the target URL is believed to be associated with a suspect network destination. In other embodiments, taking corrective action includes blocking a network connection between a computer and the network destination associated with the target URL.

Referring now to the drawings, where like or similar elements are designated with identical reference numerals throughout the several views, and referring in particular to FIG. 1A, it is a functional block diagram of a computer 100 equipped with a network address analyzer in accordance with an illustrative embodiment of the invention. Computer 100 can be a desktop computer, workstation, laptop computer, notebook computer, handheld computer, or any other device that includes computing functionality. In FIG. 1A, processor 105 communicates over data bus 110 with input devices 115, display 120, storage device 125, and memory 130.

Input devices 115 may be, for example, a keyboard and a mouse or other pointing device. In an illustrative embodiment, storage device 125 is a magnetic-disk device such as a hard disk drive (HDD). In other embodiments, however, storage device 125 can be any type of computer storage device, including, without limitation, a magnetic-disk drive, an optical-disc drive, and a storage device employing flash-memory-based media such as secure digital (SD) cards or multi-media cards (MMCs). Memory 130 may include random-access memory (RAM), read-only memory (ROM), or a combination thereof. As shown in FIG. 1A, storage device 125 contains database 135, which will be described in more detail below.

Figure 1B:
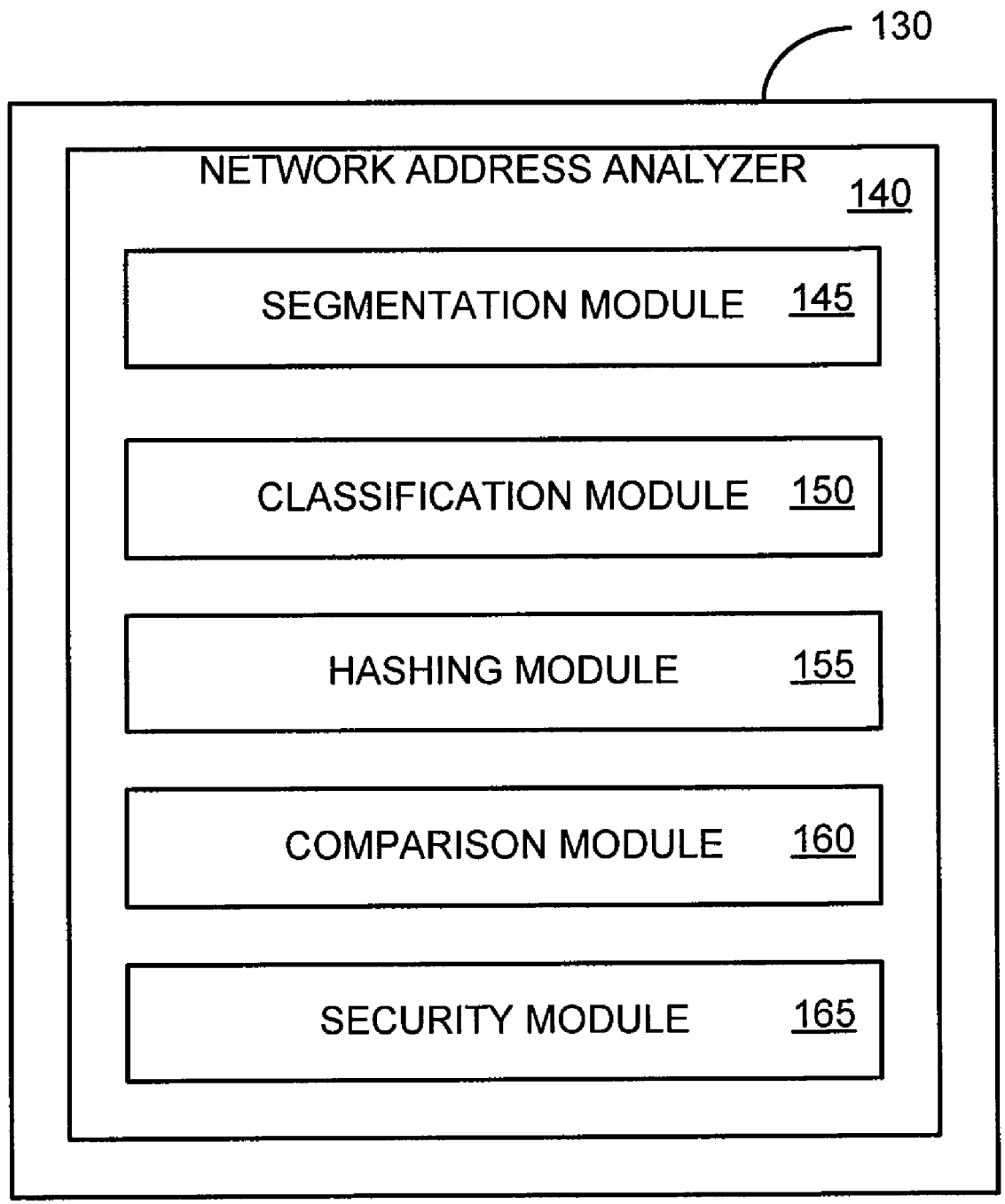
FIG. 1B is a diagram of a memory of the computer shown in FIG. 1A in accordance with an illustrative embodiment of the invention.

FIG. 1B is a diagram of memory 130 of computer 100 shown in FIG. 1A, in accordance with an illustrative embodiment of the invention. In FIG. 1B, memory 130 contains a network address analyzer 140. Network address analyzer 140 examines network addresses such as URLs to determine whether they are associated with suspect network destinations and, if so, takes appropriate corrective action. In some embodiments, computer 100 is a server in an Internet gateway, and network address analyzer 140 scans network traffic for URLs associated with suspect network addresses as the network traffic passes through the gateway. In other embodiments, computer 100 is a client machine, and network address analyzer 140 is integrated with a desktop application such as a Web browser. In a Web-browser embodiment, as a computer user browses the Internet, network address analyzer 140 analyzes requested URLs to determine whether they are associated with suspect network destinations and responds accordingly.

In the illustrative embodiment of FIG. 1B, network address analyzer 140 is an application program stored on a computer-readable storage medium of computer 100 (e.g., storage device 125) that can be loaded into memory 130 and executed by processor 105. In other embodiments, the functionality of network address analyzer 140 can be implemented in software, firmware, hardware, or any combination thereof.

For convenience in this Detailed Description, the functionality of network address analyzer 140 has been divided into several modules: segmentation module 145, classification module 150, hashing module 155, comparison module 160, and security module 165. In various embodiments of the invention, the functionality of these modules may be combined or subdivided in ways other than that indicated in FIG. 1B. In some embodiments, not all of the modules shown in FIG. 1B are included. In other embodiments, additional modules not shown in FIG. 1B may be included. For example, in some embodiments, network address analyzer 140 includes an additional module for constructing and managing database 135.

As will be explained more fully below, network address analyzer 140 interacts with database 135 in FIG. 1A. In some embodiments, network address analyzer 140 is used to construct database 135 and to analyze target URLs requiring analysis. In other embodiments, database 135 is constructed by an entity other than the user of computer 100 and is supplied to the user of computer 100, either separately or with network address analyzer 140. In this particular embodiment, network address analyzer 140 analyzes target URLs only, comparing them with the supplied database 135. In still other embodiments, network address analyzer 140 is used to update a database 135 originally supplied by an entity other than the user of computer 100.

Figures 2A, 2B:
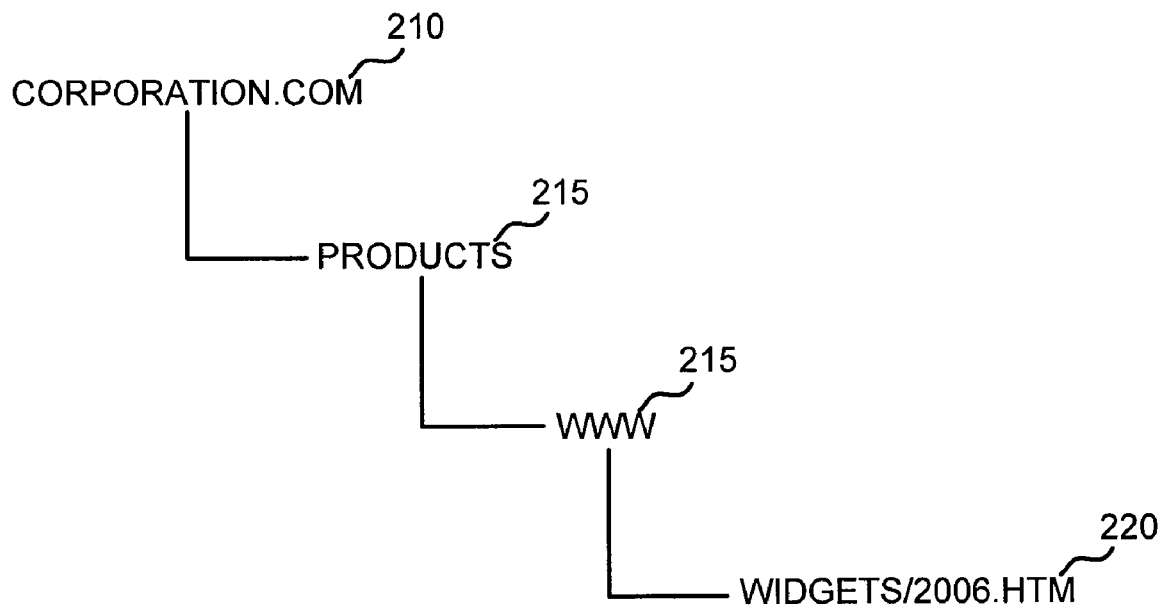
FIG. 2A is a diagram illustrating the segmentation and classification of segments of a Uniform Resource Locator (URL) in accordance with an illustrative embodiment of the invention.
FIG. 2B is a diagram showing hierarchical relationships among the segments of a URL in accordance with an illustrative embodiment of the invention.

In the illustrative embodiment of FIGS. 1A and 1B, segmentation module 145 is configured to separate a URL into component parts or "segments." These segments are then classified by classification module 150. Consider, for example, the URL "www.products.corporation.com/widgets/2006.htm." FIG. 2A is a diagram illustrating the segmentation and classification of segments of this URL in accordance with an illustrative embodiment of the invention. In FIG. 2A, this URL has been segmented into "corporation.com," "products," "www," and "widgets/2006.htm." The segment "corporation.com" has been classified as a primary domain 210. The segments "products" and "www" have been classified as subdomains 215. The segment "widgets/2006.htm," which includes the directory "widgets" and the filename "2006.htm," has been classified as a page 220. Herein, "page" is used interchangeably with "file" or "document" since files (e.g., html, PDF, etc.) displayed in a Web browser are typically referred to as "Web pages."

Once a URL has been segmented and its component parts have been classified, hashing module 155 computes a hashing function for each component part or segment to produce a hash value for that component part or segment. Each computed hash value retains the classification (primary domain, subdomain, or page/file) of the segment from which it was computed. Those skilled in the art will recognize that a simple, efficient hashing function is desirable in real-time content-filtering applications. In general, however, hashing module 155 may use any hashing function that, with reasonable reliability, produces a one-to-one mapping between text strings and their corresponding hash values. Such hashing functions are readily found in computer programming literature well known to those skilled in the computer programming art.

Comparison module 160 compares the hash values of the segments from a target URL with hash values stored in database 135 and computes a score indicating the extent to which they match. A "target URL" is a URL to be scrutinized by network address analyzer 140. The hash values stored in database 135 are obtained by hashing the segments of each of a set of URLs associated with known suspect network destinations, as explained above. To make the job of comparison module 160 easier, the segment hash values stored in database 135 may be organized according to their classification and in accordance with hierarchical relationships among the segments to which they correspond. FIG. 2B is a diagram showing one example of hierarchical relationships among the segments of a URL in accordance with an illustrative embodiment of the invention. FIG. 2B indicates that the subdomain 215 "products" is subordinate (narrower in scope) than primary domain 210 "corporation.com," that subdomain 215 "www" is subordinate to subdomain 215 "products," and that page 220 "widgets/2006.htm" is subordinate to all of the other URL segments.

Just as it makes sense to organize a residential phone book by last names, database 135 may be organized so that primary domains 210 are analogous to last names in a phone book. The comparison can begin at the primary-domain level, and a match on a primary domain 210 can be followed up with a search of subdomains 215 within that primary domain 210 and, finally, with a search of pages 220 within that primary domain 210 and subdomain 215.

In an illustrative embodiment, comparison module 160 is configured to assign a value to each match that occurs between a hash value from the target URL and a hash value in database 135. This value is weighted according to the classification of the matching hash values. In some embodiments, primary domains 210 are weighted more heavily (given precedence over) pages 220. In other embodiments, the reverse is true. In still other embodiments, a user can specify the weight to be given to each of the respective classifications to fine tune the operation of network address analyzer 140.

Once all of the individual segment-hash-value matches have been found for a given target URL, the weighted values assigned to the respective segment matches are combined (e.g., summed or multiplied) to yield an overall score indicating the degree of match.

Figure 2C:
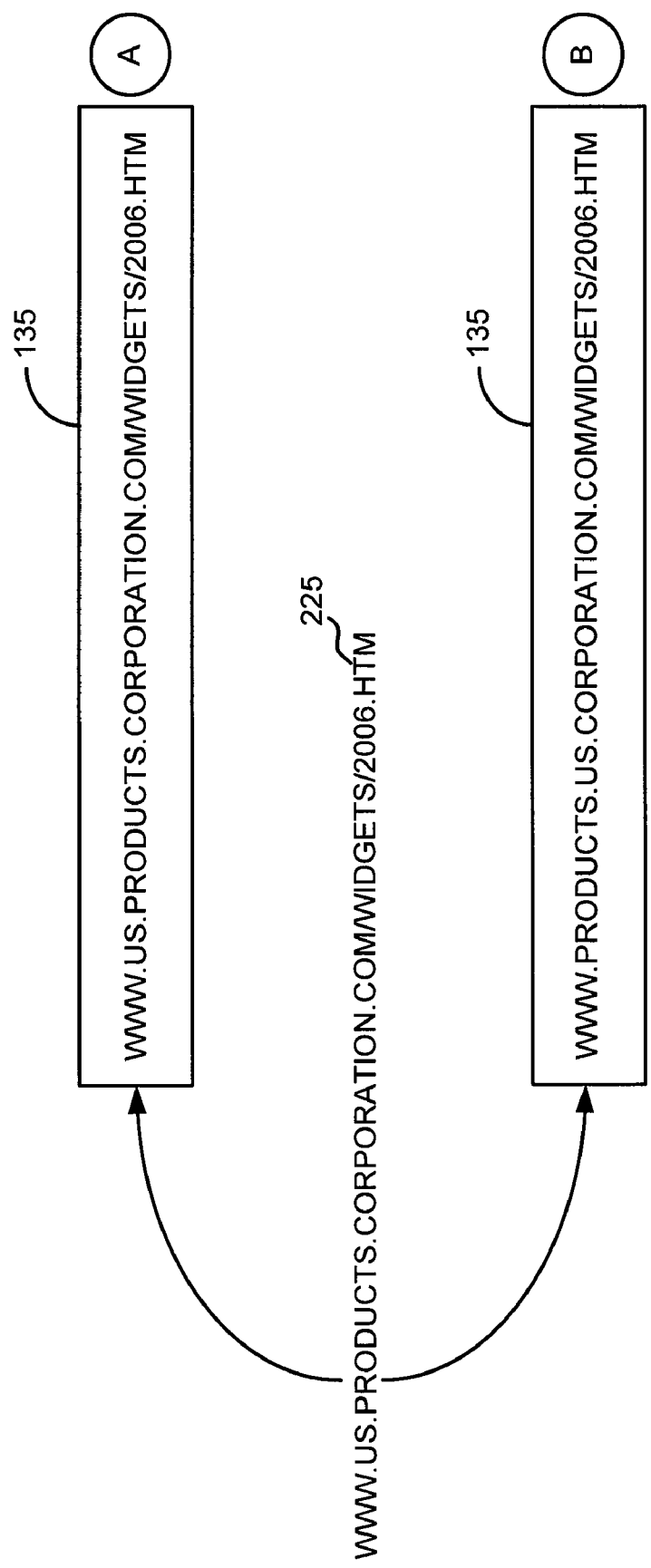
FIG. 2C is a diagram illustrating exact and out-of-order matches, respectively, between a target URL and a comparison URL, in accordance with an illustrative embodiment of the invention.

One significant advantage of the invention is that it takes into account imperfect matches between the segments of a target URL and a comparison database. How sensitive network address analyzer 140 should be to such imperfect matches can, in some embodiments, be configured by the user. One way in which an imperfect match can occur is illustrated in FIG. 2C. In the illustrative embodiment of FIG. 2C, the component parts of a target URL 225, "www.us.products.corporation.com/widgets/2006.htm," are compared, in two separate scenarios labeled "A" and "B," with hash values stored in database 135. In Scenario A, the match is exact, and the score computed by comparison module 160 is maximized. In Scenario B, all of the individual component parts of the two URLs match, but the order of the subdomains in the network address is different. Such a match may be termed an "out-of-order match." Comparison module 160 may account for an out-of-order match by weighting matches of segments that occur out of order less heavily than those that occur in the order indicated by database 135. In other words, a match that occurs in an incorrect position within an ordered sequence of hash values as determined by database 135 is weighted less heavily than a match that occurs in a correct position within that ordered sequence of hash values.

Security module 165 is configured to take corrective action if the score computed by comparison module 160 satisfies a predetermined criterion. The predetermined criterion can take on many forms, depending on the particular embodiment. In one embodiment, the predetermined criterion is that the score exceed a threshold. The threshold is fixed in some embodiments; in other embodiments, it is adjustable by a user. In another embodiment, the predetermined criterion is that the computed score satisfy some other condition or set of conditions other than the exceeding of a threshold. For example, security module 165 could be configured to take corrective action based on a primary-domain match without further segment matches. Such a condition is, in some embodiments, specified by a user.

The corrective action taken by security module 165 can also take on a variety of forms, depending on the particular embodiment. In one illustrative embodiment, security module 165 notifies a user that the target URL is believed to be associated with a suspect network destination. In a different illustrative embodiment, security module 165 prevents a network connection between a computer and the network destination associated with the target URL. In embodiments in which computer 100 is a server, security module 165 prevents a connection between another computer on the network (e.g., the Internet) and the network destination associated with the target URL. In embodiments in which computer 100 is a client, security module 165 blocks a connection between computer 100 and the network destination associated with the target URL.

Figure 3:
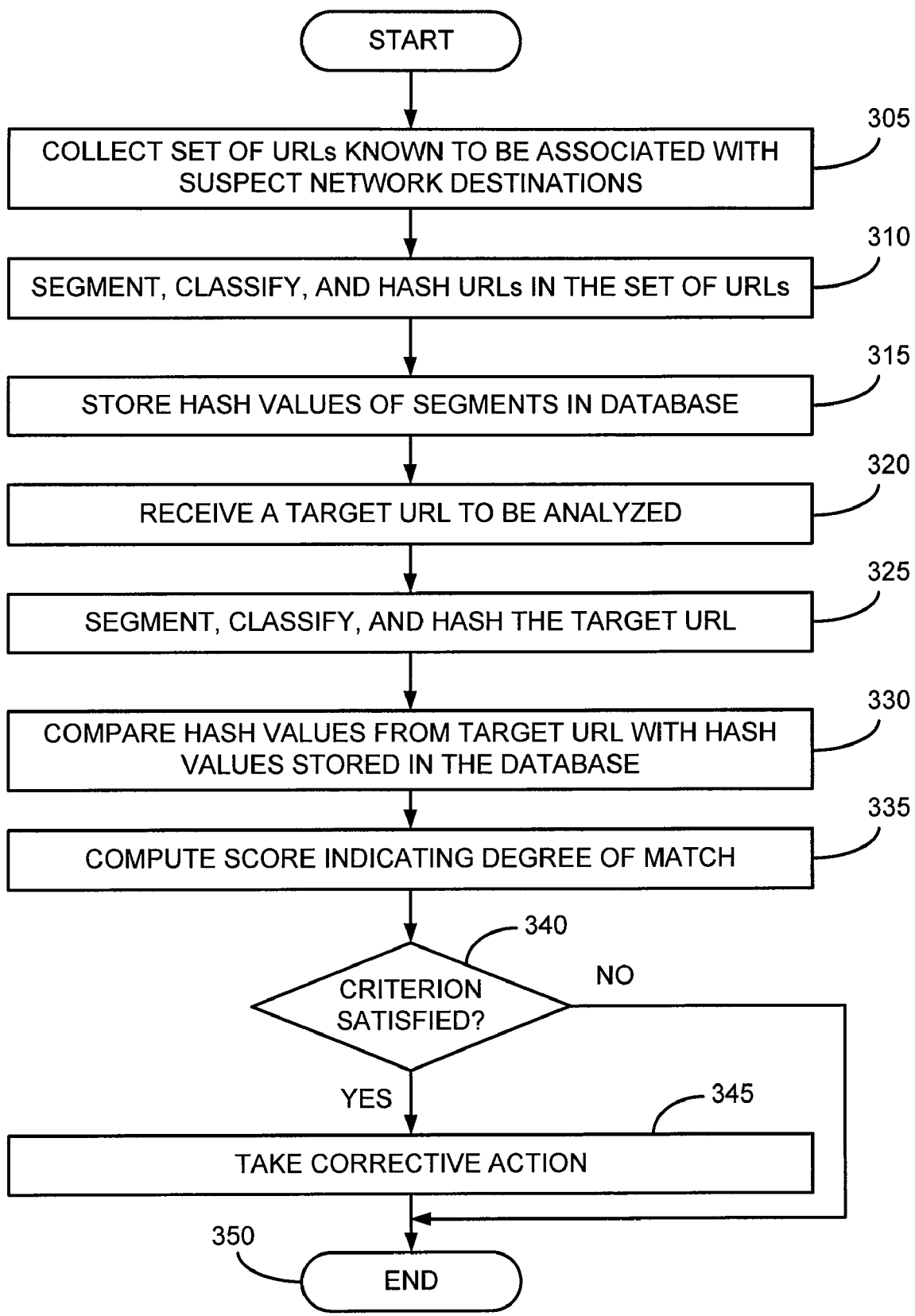
FIG. 3 is a flowchart of a method for identifying a network address associated with a suspect network destination in accordance with an illustrative embodiment of the invention.

FIG. 3 is a flowchart of a method for identifying a network address associated with a suspect network destination in accordance with an illustrative embodiment of the invention. At 305, the process of building a comparison database begins with the collection of a set of URLs that are associated with known suspect network destinations. At 310, segmentation module 145 divides each URL in this set of URLs into segments. For each URL in this set of URLs, classification module 150 classifies each segment as a primary domain 210, subdomain 215, or page 220. Hashing module 155 then hashes each classified segment to produce an associated hash value. At 315, the resulting hash values are stored in a comparison database such as database 135 in a manner that provides for efficient and rapid comparison between the hash values in the database and hashed segments of a target URL 225 to be analyzed.

At 320, network address analyzer 140 receives a target URL 225 to be analyzed. At 325, segmentation module 145 segments the target URL 225, classification module 150 classifies the segments of the target URL 225, and hashing module 155 hashes the segments of the target URL 225. These operations of segmentation, classification, and hashing that are performed on the target URL 225 are, of course, the same as those performed on the comparison URLs whose hashed segments are stored in database 135 so that a direct comparison can be made between the hash values derived from the target URL 225 and the hash values stored in the database 135.

At 330, comparison module 160 compares the hash values of the segments from the target URL with the hash values stored in database 135. Comparison module 160, at 335, computes a score indicating the extent to which the hash values of the segments from the target URL match hash values stored in database 135. This score, as explained above, can be based on partial matches of a subset of the segments in the target URL or on out-of-order matches in which each segment of the target URL matches a segment stored in database 135 but in a different order than that indicated by database 135.

At 340, if the score computed at 335 satisfies a predetermined criterion, security module 165 takes corrective action at 345, as explained above. At 350, the process terminates.

Figure 4:
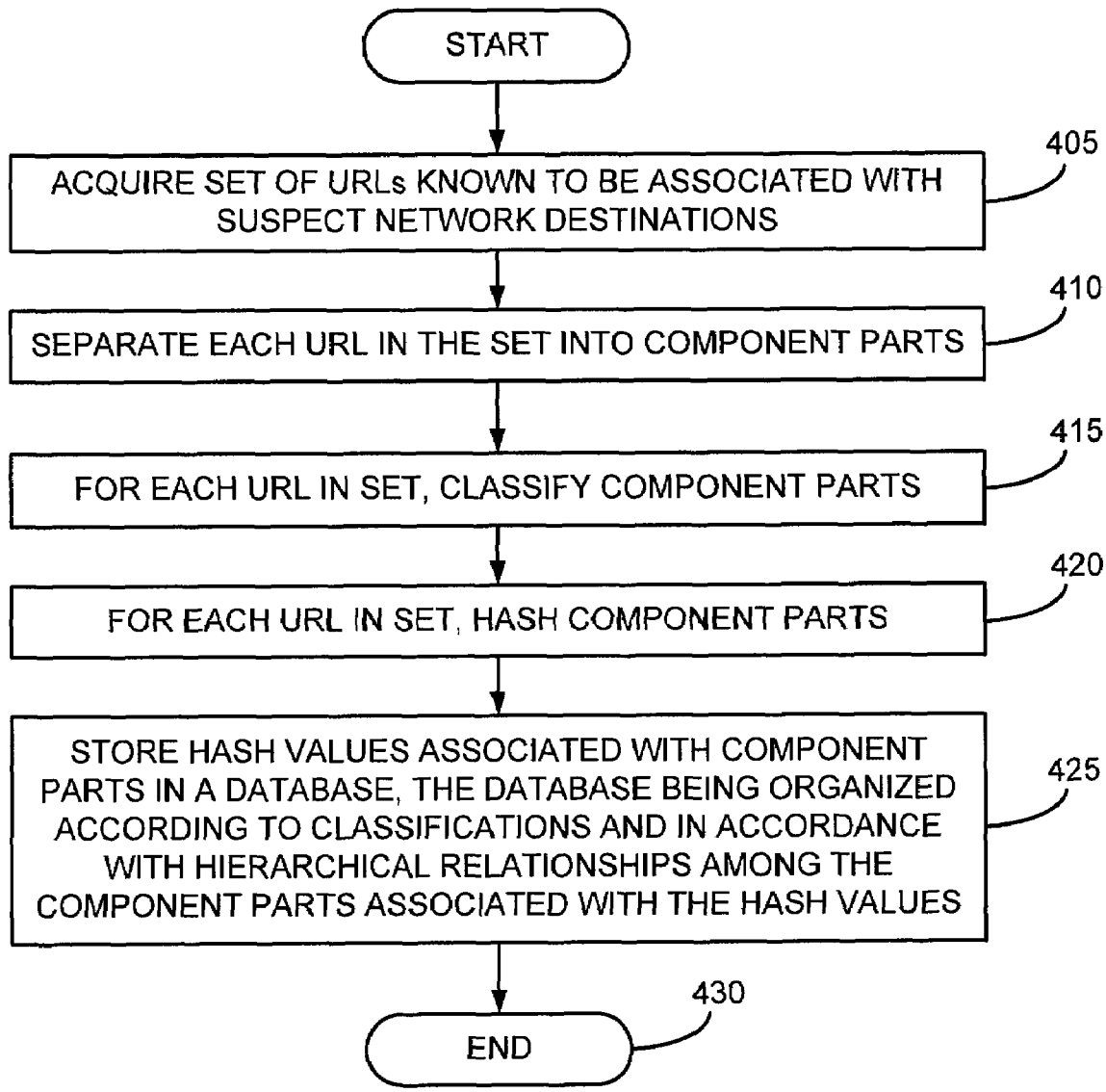
FIG. 4 is a flowchart of a method for constructing a database for use in identifying network addresses associated with suspect network destinations in accordance with another illustrative embodiment of the invention.

FIG. 4 is a flowchart of a method for constructing a database 135 for use in identifying network addresses associated with suspect network destinations in accordance with another illustrative embodiment of the invention. At 405, a set of URLs that are associated with known suspect network destinations (e.g., pestware or porn sites) is acquired. At 410, segmentation module 145 separates each URL in this set of URLs into component parts. For each URL in this set of URLs, classification module 150, at 415, classifies each component part as a primary domain 210, subdomain 215, or page 220. At 420, hashing module 155 hashes each classified component part to produce a corresponding hash value. Each computed hash value inherits the same classification as the component part from which it was computed. At 425, the resulting hash values are stored in database 135. In this illustrative embodiment, database 135 is organized according to the classifications of the respective component parts from which they were computed and in accordance with hierarchical relationships among the component parts such as those illustrated in FIG. 2B. This organization of database 135 allows rapid and efficient comparisons with the hashed component parts of a target URL 225. At 430, the process terminates.

Figure 5A:
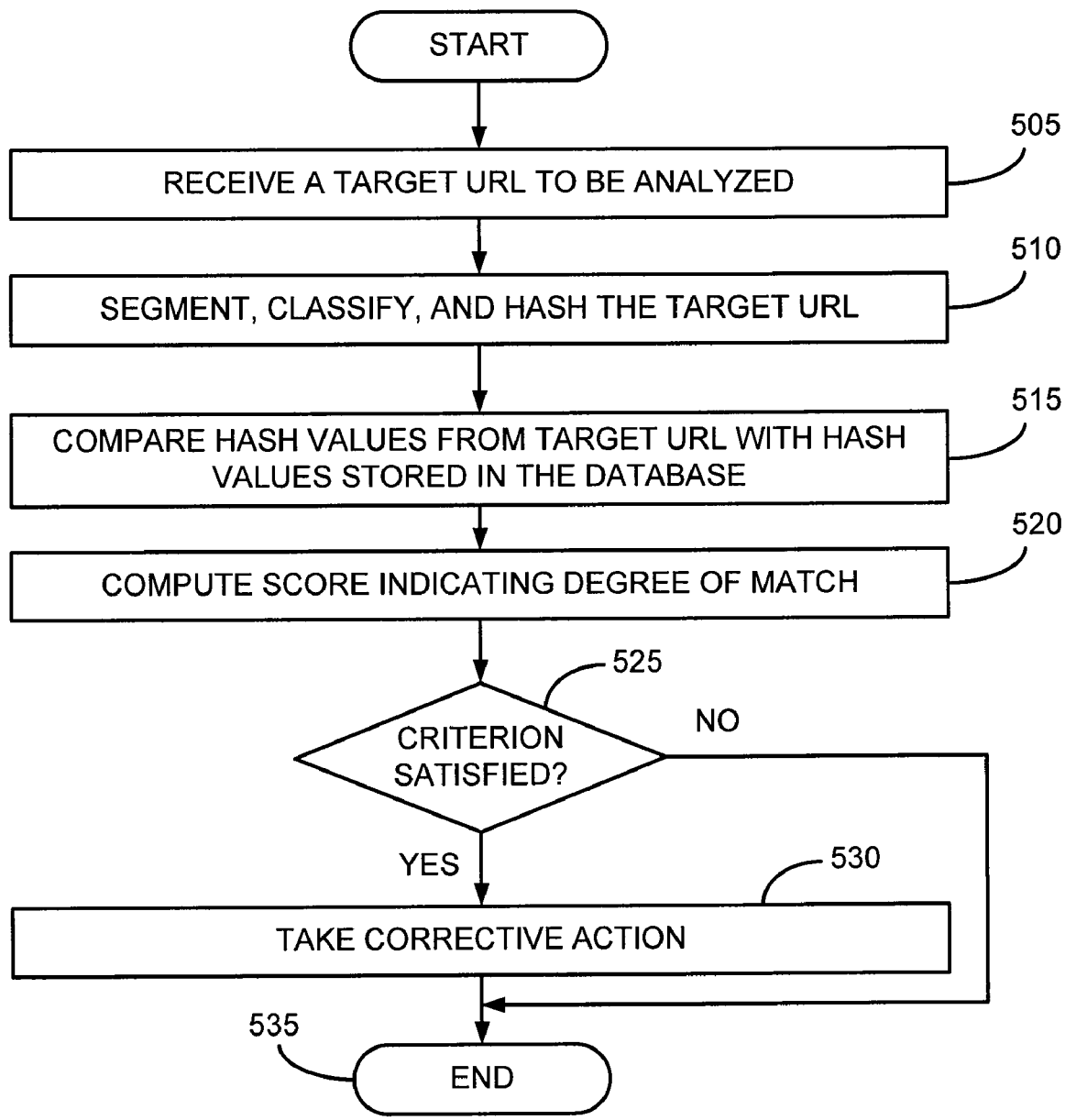
FIG. 5A is a flowchart of a method for identifying a network address associated with a suspect network destination in accordance with another illustrative embodiment of the invention.

FIG. 5A is a flowchart of a method for identifying a network address associated with a suspect network destination in accordance with another illustrative embodiment of the invention. In this embodiment, database 135 is presumed to have been constructed beforehand (e.g., by the process discussed in connection with FIG. 4). At 505, network address analyzer 140 receives a target URL 225 to be analyzed. At 510, segmentation module 145 segments the target URL 225, classification module 150 classifies the segments of the target URL 225, and hashing module 155 hashes the segments of the target URL 225.

At 515, comparison module 160 compares the hash values of the segments from the target URL 225 with the hash values stored in database 135. Comparison module 160, at 520, computes a score indicating the extent to which the hash values of the segments from the target URL 225 match one or more hash values stored in database 135.

At 525, if the score computed at 520 satisfies a predetermined criterion, security module 165 takes corrective action at 530, as explained above. At 535, the process terminates.

Figure 5B:
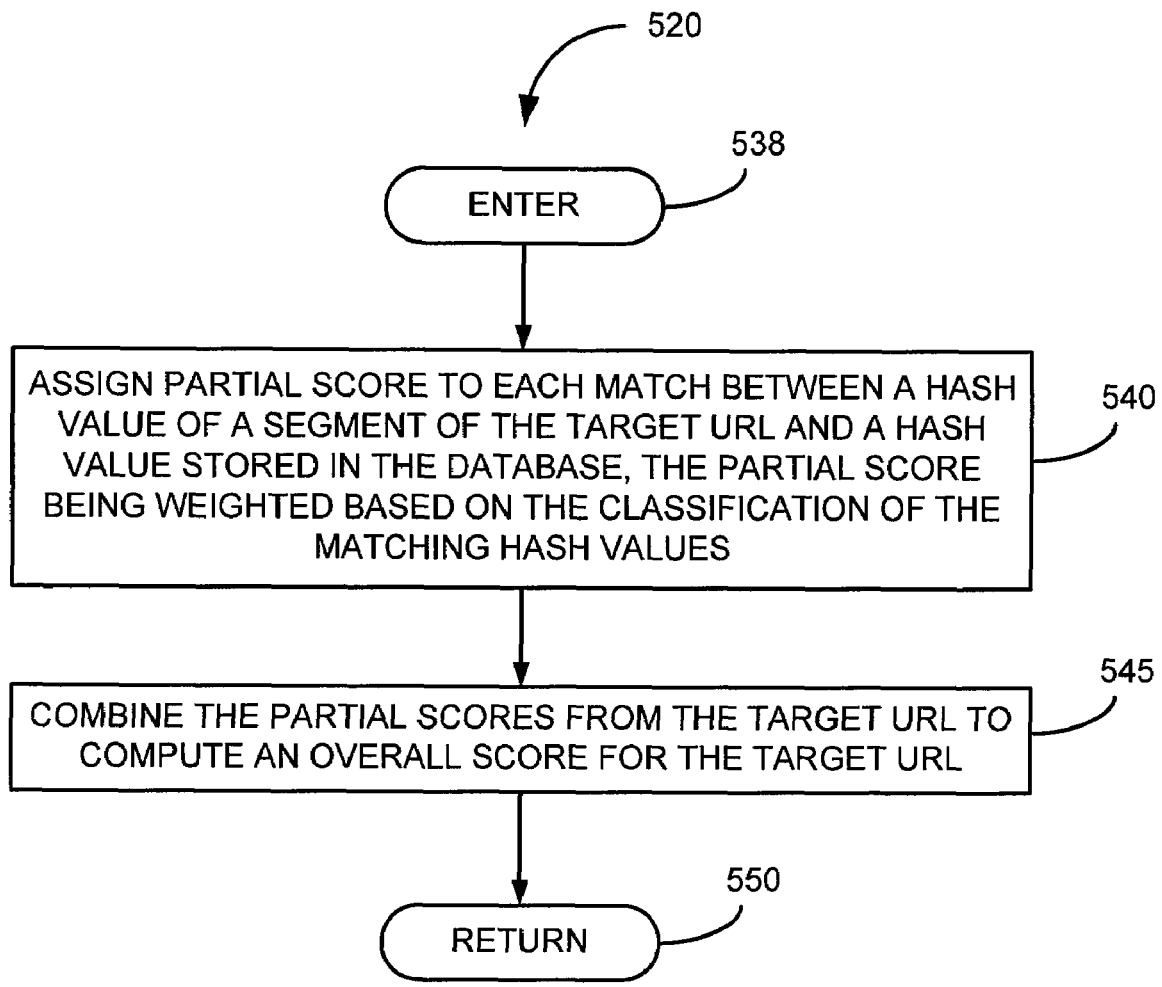
FIG. 5B is a flowchart of a method for computing a score indicating the extent to which hash values of segments from a target URL match hash values stored in a database in accordance with another illustrative embodiment of the invention.

FIG. 5B is a flowchart of a method for computing a score indicating the extent to which hash values of segments from a target URL 225 match hash values stored in a database 135 in accordance with another illustrative embodiment of the invention. The process is entered at 538. At 540, comparison module 160 assigns a partial score to each match between a hash value of a segment of the target URL 225 and a hash value stored in database 135. Comparison module 160, in this embodiment, is also configured to weight the partial score in accordance with the classification of the matching hash values. In some embodiments, comparison module 160 is configured to weight primary domains the most heavily of all classifications, subdomains the next most heavily, and pages/files the least heavily. In other embodiments, the relative weighting of the classifications is the reverse of this, pages/files being given the most weight. In some embodiments, the relative weights among the classifications are be specified and adjusted by a user.

At 545, comparison module 160 combines the partial scores from the target URL 225 assigned at 540 to produce an overall score indicating the extent to which the hash values of the segments from the target URL 225 match one or more hash values stored in database 135. At 550, the process returns to a calling process such as that shown in FIG. 5A.

Figure 6:
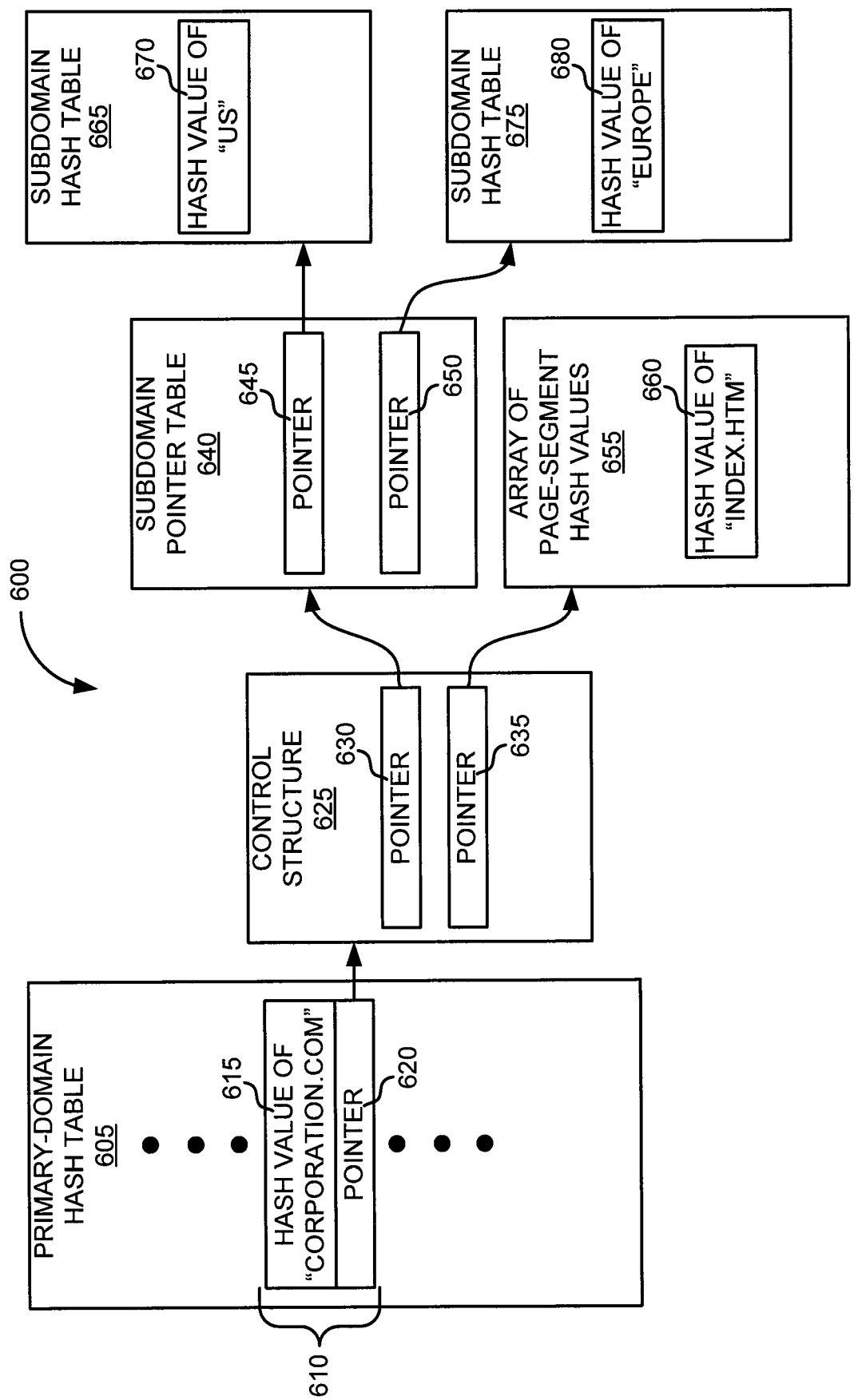
FIG. 6 is a diagram of the data structures in a database in accordance with yet another illustrative embodiment of the invention.

FIG. 6 is a diagram of the data structures in a database 600 in accordance with yet another illustrative embodiment of the invention. FIG. 6 shows one example of a database organized according to segment classifications and in accordance with hierarchical relationships among the segments of the URLs making up the database. Database 600 includes a set of linked, hierarchical (tree-structured) data structures. Primary-domain hash table 605 includes one or more entries 610, each of which includes a hash value 615 of a primary-domain string and a pointer 620.

Pointer 620 points to a control structure 625 that contains one or more pointers such as pointers 630 and 635. In some implementations, control structure 625 also includes information on the maximum length of the "tree," usage information such as what files can and cannot be deleted, or other administrative information. Pointer 630 points to a subdomain pointer table containing one or more pointers such as pointers 645 and 650. Pointer 635 points to an array (flat list) 665 of page-segment hash values such as page-segment hash value 660 that are associated with (subordinate to) a particular primary domain 210 or subdomain 215. In this example, page-segment hash value 660 is a hash of the string "index.htm." The primary domain 210 or subdomain 215 to which the page-segment hash values 660 stored in array 665 are subordinate is also contained in control structure 625 (not shown in FIG. 6).

Pointer 645 points to subdomain hash table 665, which contains a hash value 670 of a particular subdomain string (in this example, "us"). Pointer 650 points to subdomain hash table 675, which contains a hash value 680 of another particular subdomain string (in this example, "europe").

The organization shown in FIG. 6 provides for rapid and efficient comparison of hashed URL segments between a target URL and database 600. Comparison begins with primary-domain hash table 605, proceeds, via control structure 625, to subdomain hash tables and, finally to page-segment arrays, in accordance with the tree-structured organization of database 600 and the intermediate segment matches that occur.

In conclusion, the present invention provides, among other things, a method and system for identifying network addresses associated with suspect network destinations. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for identifying a network address associated with a suspect network destination, the method comprising:
    collecting a set of Uniform Resource Locators (URLs), each URL in the set of URLs being associated with a suspect network destination;
    segmenting each URL in the set of URLs into a set of component parts;
    for each URL in the set of URLs, classifying each component part in the set of component parts from that URL as one of a primary domain, a subdomain, and a page;
    for each URL in the set of URLs, hashing each component part in the set of component parts from that URL to produce a hash value for that component part;
    storing in a database the hash values of the component parts of the URLs in the set of URLs;
    receiving a target URL to be analyzed;
    segmenting the target URL into a set of component parts;
    classifying each component part in the set of component parts from the target URL as one of a primary domain, a subdomain, and a page;
    hashing each component part in the set of component parts from the target URL to produce a hash value for that component part;
    comparing the hash values of the set of component parts from the target URL with the hash values stored in the database;
    computing a score that indicates the extent to which the hash values of the set of component parts from the target URL match hash values stored in the database; and
    taking corrective action, when the score satisfies a predetermined criterion, and wherein the predetermined criterion is that the score exceed a predetermined threshold.

2. The method of claim 1, wherein a suspect network destination is a network destination that is associated with pestware.

3. The method of claim 1, wherein taking corrective action includes notifying a user that the target URL is believed to be associated with a suspect network destination.

4. The method of claim 1, wherein taking corrective action includes preventing a connection between a computer and a network destination associated with the target URL.

5. The method of claim 1, wherein the comparing is performed for hash values of component parts classified as primary domains, subdomains, and pages, in that order.

6. A method for identifying a network address associated with a suspect network destination, the method comprising:
    receiving a target Uniform Resource Locator (URL) to be analyzed;
    segmenting the target URL into a set of component parts;
    classifying each component part in the set of component parts from the target URL as one of a primary domain, a subdomain, and a page;
    hashing each component part in the set of component parts from the target URL to produce a hash value for that component part, the hash value having a classification that coincides with the classifying of that component part;
    comparing the hash values of the set of component parts from the target URL with hash values stored in a database, the hash values stored in the database having been obtained by segmenting, classifying, and hashing, in the same manner as the target URL, each of a set of URLs known to be associated with suspect network destinations;
    computing a score that indicates the extent to which the hash values of the set of component parts from the target URL match hash values stored in the database; and
    taking corrective action, when the score satisfies a predetermined criterion, and wherein the predetermined criterion is that the score exceed a predetermined threshold.

7. The method of claim 6, wherein computing the score includes:
    assigning a partial score to each match between a hash value of a component part in the set of component parts from the target URL and a hash value stored in the database, the partial score being weighted based on the classification of the matching hash values; and
    combining the partial scores from the target URL to produce the score.

8. The method of claim 7, wherein a match that occurs in an incorrect position within an ordered sequence of hash values as determined by the database is weighted less heavily than a match that occurs in a correct position within the ordered sequence of hash values.

9. The method of claim 7, wherein primary-domain matches are weighted more heavily than page matches.

10. The method of claim 7, wherein page matches are weighted more heavily than primary-domain matches.

11. The method of claim 7, wherein, in assigning the partial score, how heavily a classification is weighted is configurable by a user.

12. The method of claim 6, wherein taking corrective action includes notifying a user that the target URL is believed to be associated with a suspect network destination.

13. The method of claim 6, wherein taking corrective action includes preventing a connection between a computer and a network destination associated with the target URL.

14. The method of claim 6, wherein the predetermined threshold is adjustable by a user.

15. The method of claim 6, wherein the predetermined criterion is that a hash value of a primary domain in the target URL matches a primary-domain hash value in the database.

16. A system for identifying a network address associated with a suspect network destination, the system comprising:
   a segmentation module configured to segment a target Uniform Resource Locator (URL) into a set of component parts;
   a classification module configured to classify each component part in the set of component parts as one of a primary domain, a subdomain, and a page;
   a hashing module configured to compute a hash value for each component part in the set of component parts;
   a database containing hash values obtained from a set of URLs known to be associated with suspect network destinations, each URL in the set of URLs having been segmented, classified, and hashed in a manner analogous to the target URL;
   a comparison module configured to:
      compare the hash values of the component parts in the set of component parts with hash values stored in the database; and
      compute a score that indicates the extent to which the hash values of the component parts in the set of component parts match hash values stored in the database; and
   a security module configured to take corrective action when the score satisfies a predetermined criterion, and wherein the predetermined criterion is that the score exceed a predetermined threshold.

17. The system of claim 16, wherein the database includes a primary-domain hash table containing a plurality of entries, each entry including a hash value associated with a primary domain and a pointer to a control structure, the control structure containing at least one of a pointer to a subdomain hash table and a pointer to a flat list of hash values associated with one or more pages, the subdomain hash table containing at least one pointer to a hash value associated with a subdomain.

18. The system of claim 17, wherein the comparison module is configured to compare the hash values of the component parts in the set of component parts with the hash values stored in the database by traversing the database from the primary-domain hash table to a subdomain hash table to a flat list of hash values associated with pages, in that order.

19. The system of claim 16, wherein the security module is configured to take corrective action by alerting a user that the target URL is believed to be associated with a suspect network destination.

20. The system of claim 16, wherein the security module is configured to take corrective action by blocking a connection between a computer and a network destination associated with the target URL.

* * * * *